United States Patent
Matko et al.

(10) Patent No.: US 7,355,628 B2
(45) Date of Patent: Apr. 8, 2008

(54) METHOD AND APPARATUS OF MAINTAINING A VIDEO SIGNAL THROUGH BRIEF INTERRUPTIONS OF A RELATED CONTROL SIGNAL

(75) Inventors: Mark A. Matko, North Olmstead, OH (US); Craig S. Haehn, Avon Lake, OH (US); Duane R. Johnson, Wellington, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 661 days.

(21) Appl. No.: 10/324,881

(22) Filed: Dec. 20, 2002

(65) Prior Publication Data

US 2004/0119866 A1 Jun. 24, 2004

(51) Int. Cl.
- H04N 7/00 (2006.01)
- H04N 7/18 (2006.01)
- H04N 9/47 (2006.01)
- H04N 5/232 (2006.01)
- H04N 5/222 (2006.01)
- H04N 5/225 (2006.01)

(52) U.S. Cl. .............. 348/148; 348/118; 348/372; 348/211.8; 348/333.01; 348/333.06

(58) Field of Classification Search ................ 348/113, 348/115, 118, 372, 211.8, 333.06, 837; 340/468, 340/469, 937; 250/330
See application file for complete search history.

(56) References Cited

U.S. PATENT DOCUMENTS

| | | | |
|---|---|---|---|
| 4,533,962 A * | 8/1985 | Decker et al. ................. 360/5 |
| 5,530,421 A | 6/1996 | Marshall et al. | |
| 5,680,123 A * | 10/1997 | Lee ............................ 340/937 |
| 5,790,878 A * | 8/1998 | Anderson et al. ........... 713/340 |
| 5,793,420 A * | 8/1998 | Schmidt ...................... 348/148 |
| 5,805,209 A | 9/1998 | Yuge et al. | |
| 5,940,120 A * | 8/1999 | Frankhouse et al. .......... 348/61 |
| 5,978,017 A | 11/1999 | Tino | |
| 6,028,528 A | 2/2000 | Lorenzetti et al. | |
| 6,211,907 B1 | 4/2001 | Scaman et al. | |
| 6,226,389 B1 | 5/2001 | Lemelson et al. | |
| 6,333,759 B1 * | 12/2001 | Mazzilli ...................... 348/148 |
| 6,412,950 B1 * | 7/2002 | Strumolo et al. .............. 353/13 |
| 6,420,977 B1 | 7/2002 | Corbitt et al. | |
| 6,542,182 B1 * | 4/2003 | Chutorash ................... 348/148 |
| 6,559,769 B2 | 5/2003 | Anthony et al. | |
| 6,580,450 B1 | 6/2003 | Kersting et al. | |
| 6,593,960 B1 | 7/2003 | Sugimoto et al. | |
| 6,690,268 B2 * | 2/2004 | Schofield et al. ........... 340/438 |
| 6,825,469 B2 * | 11/2004 | Yamaguchi et al. ......... 250/330 |
| 6,877,879 B2 * | 4/2005 | Holz et al. .................. 362/259 |
| 6,912,005 B2 * | 6/2005 | Senda .................... 348/333.06 |

* cited by examiner

*Primary Examiner*—Lin Ye
*Assistant Examiner*—Richard M Bemben
(74) *Attorney, Agent, or Firm*—Calfee, Halter & Griswold LLP

(57) ABSTRACT

A night vision system that allows a video camera to continue to be operational after a power control signal, such as a headlamp switch, to the camera has been temporarily interrupted. The system is designed to avoid a camera calibration or equalization process every time the power control signal from the camera or a display unit is disrupted.

15 Claims, 2 Drawing Sheets

METHOD AND APPARATUS OF MAINTAINING A VIDEO SIGNAL THROUGH BRIEF INTERRUPTIONS OF A RELATED CONTROL SIGNAL

FIELD OF THE INVENTION

The present invention is directed to a delay function for a camera display system, and specifically to a night vision camera system used on commercial vehicles.

BACKGROUND OF THE INVENTION

Night vision systems, infrared camera systems, security camera systems or the like typically used in commercial vehicles use either a liquid crystal display (LCD) or a head up/down display (HUD, HDD) to display a video signal from the cameras on the vehicle to be viewed by the driver or passenger of the vehicle.

In the present art, cameras and video displays for vehicle vision systems are directly connected to the battery power of the vehicle. A period of time elapses in order for the camera to calibrate before a video signal will appear on the display. If the control signal from the battery circuit is disrupted, the video signal is lost, including the viewable image. Once the control signal is restored, no matter how quickly, the camera must calibrate again.

Accordingly, the need exists for a delay function to maintain a video signal after the control signal to the vision system has been interrupted.

SUMMARY OF THE INVENTION

The present invention provides for apparatus and process of maintaining a video signal on a display system through interruptions of a related control signal for a selected time period, such as a headlamp indicator, for example.

The present invention also contemplates a method of controlling a camera for a vision system used on a vehicle. In one embodiment, the method includes generating a control signal that corresponds to a selected condition for operating the camera, turning the camera on in response to the control signal to display a video signal from the camera, the camera remaining on in response to continued presence of the control signal, maintaining the camera on during a temporary interruption of the control signal.

DETAILED DESCRIPTION OF THE INVENTION

The present invention relates to a vision system for vehicles. The invention is used to avoid a calibrating process for a camera every time a power control switch is disrupted or opened. Visual displays become active well before a camera can output an acceptable video signal. At the same time, once the present system is operational, the power control switch is allowed to be disrupted for up to a programmed time without losing the video signal by including a delay function in the camera control circuit.

Figure 2:
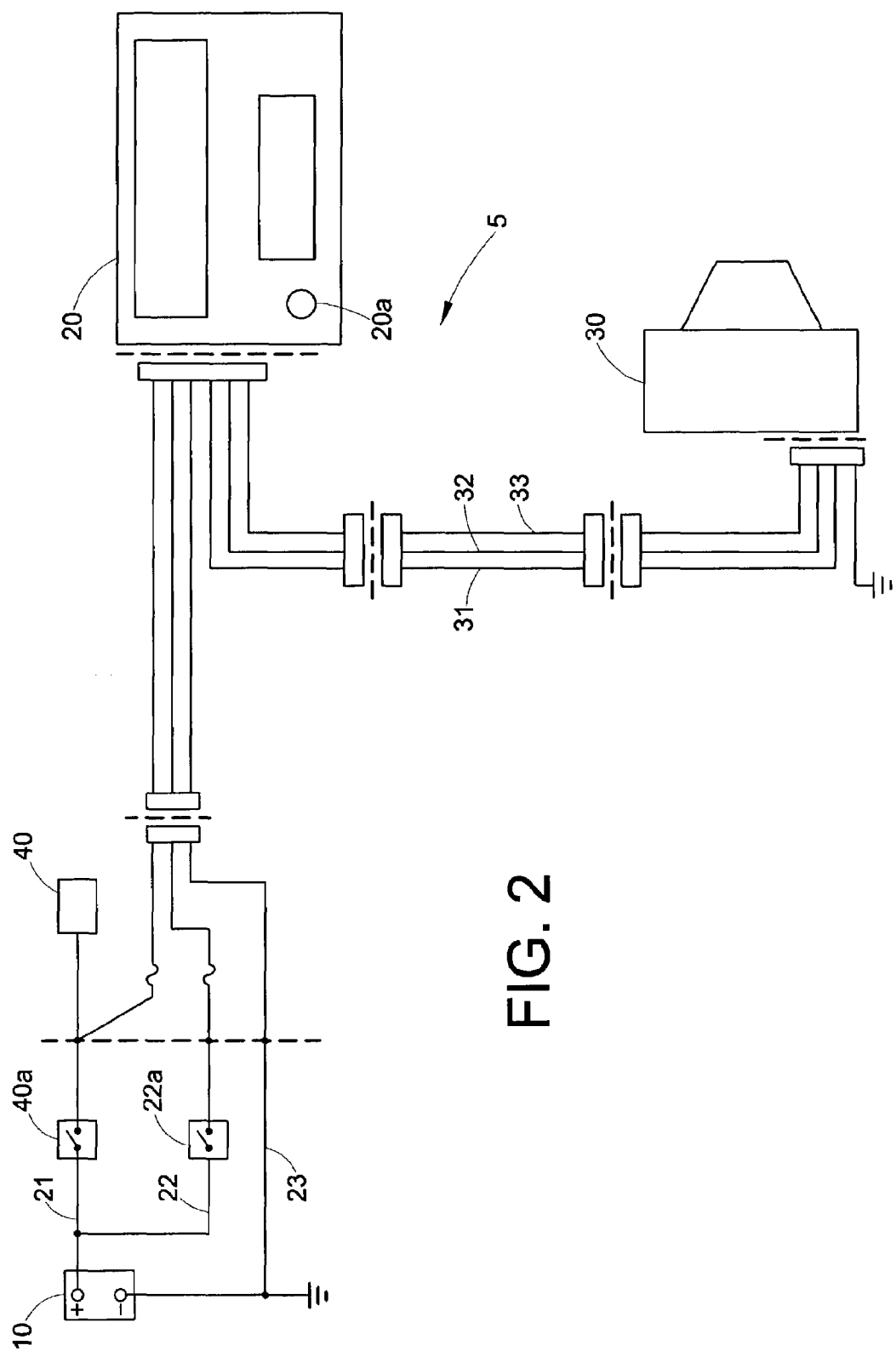
FIG. 2 is a schematic of an exemplary circuit in accordance with the present invention.

In the preferred embodiment, a programmable logic circuit (PLC) or other suitable control circuit, internal a video display, is used with a night vision system capable of being installed on any type of vehicle, preferably heavy or commercial vehicles, for nighttime driving. As shown in FIG. 2, the vision system includes a power source 10, a display unit 20, and an infrared sensor or camera 30.

The display unit 20, which can be an LCD, HUD, HDD, television or computer monitor, among other types of video displays, is connected to the power source or battery 10 of the vehicle by lines 21, 22, and 23, and in turn, the camera 30 is connected to the display unit 20 by lines 31, 32 and 33, therefore, receiving power through the display unit 20. Line 31 is for the power connection, line 32 is for a heater connection, and line 33 is for a video connection. In the preferred embodiment, the camera 30 receives power through the display unit 20, shown by line 31 in FIG. 2. Allowing the camera 30 to receive power through the display unit 20 controls the power to the camera 30. By designing the vision system this way, the power is conditioned similar to a filter to prevent, as an example, electrical spikes that would damage the camera 30.

Figure 1:
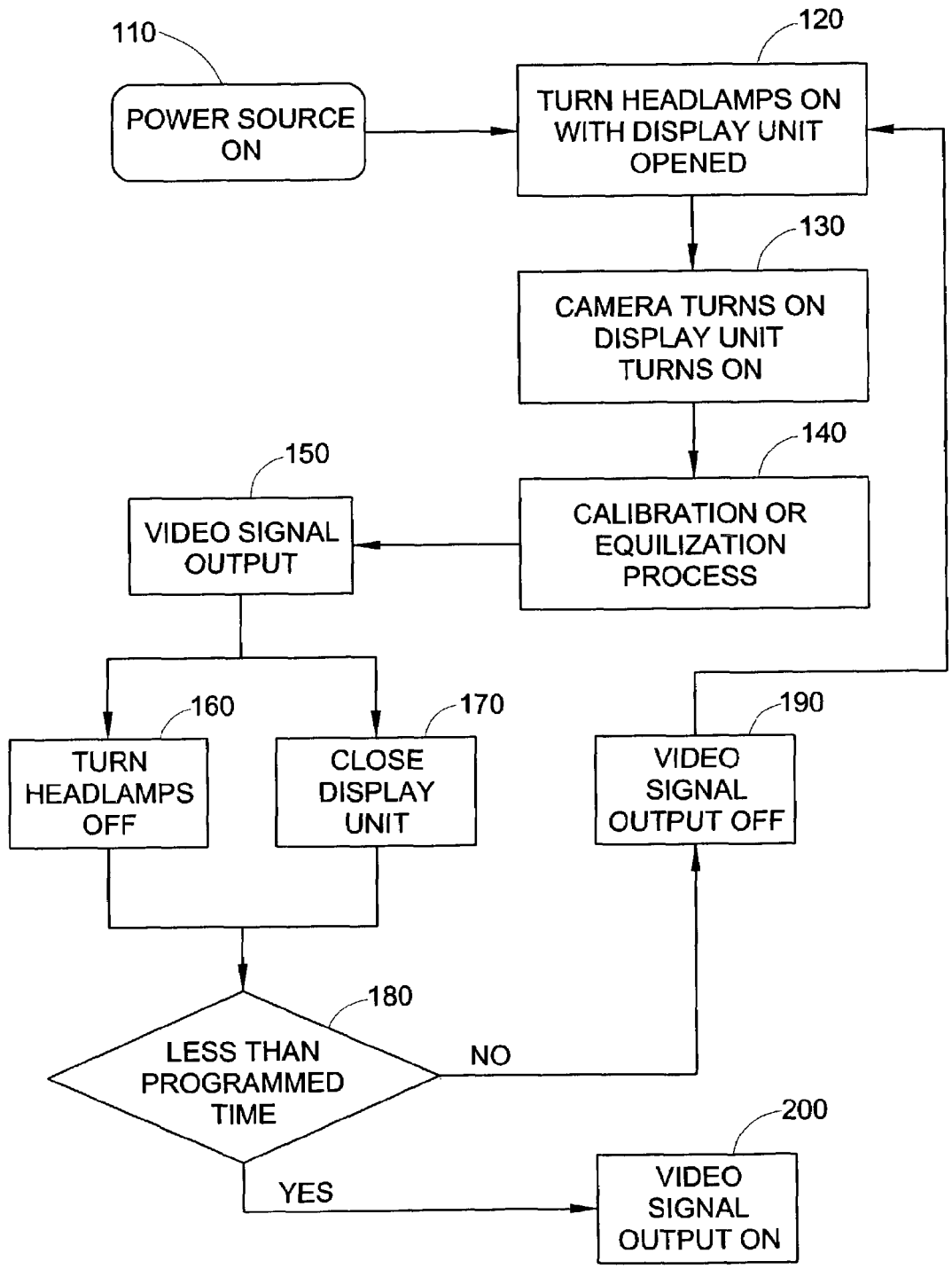
FIG. 1 is a flowchart of an exemplary embodiment of a method according to the present invention.

To turn the display unit 20 and camera 30 on in the preferred embodiment, as illustrated in FIG. 1, a control signal is generated, after starting the ignition of the vehicle 110. In the exemplary embodiment, the control signal corresponds to turning on the headlights or headlamps 40, 120 of the vehicle, therefore the headlamp switch 40a is the control signal. The control signal may alternatively be a function of other functions. The ignition circuitry is shown by line 22 with ignition switch 22a. The headlamp switch 40a is closed to turn the headlamps 40 on and the headlamp switch 40a is opened to turn the headlamps 40 off. A headlamp signal to turn the vision system on is preferred to prevent the driver from driving at night with the headlamps 40 off.

As shown in FIG. 1, once the control signal is generated, the camera turns 130 on and performs a calibration process or thermal equalization process 140 before being able to send a complete video signal to the display unit 20. The length of time for the camera 30 to calibrate or equalize is dependent, for example, on temperature conditions and the type of camera used. In colder temperatures, the thermal equalization process will take a longer period of time. The thermal equalization process relates to the focal plane array of the camera warming to a workable temperature. Currently, the camera 30 in the preferred embodiment under preferred temperature conditions will take approximately forty-eight (48) seconds to equalize. However, as stated above, the calibration time period varies depending on criteria such as, for example, temperature and camera type.

Display unit 20, which receives a video signal from the camera 30, is connected to the camera 30 and the battery 10. The display unit 20 also turns on 130 when the control signal, i.e. headlamp switch, is generated. In addition, the display unit 20 may be turned on by a control switch 20a located on the display unit 20. If the control switch 20a is in the on position and opened 120 when the vehicle headlamps 40 are turned on, the display unit 20 will turn on as well. However, an image will not appear until after the camera calibration process or thermal equalization process has been completed, as shown in FIG. 1. Once the camera is calibrated or equalized, a complete video signal is outputted 150 to the display unit 20.

A driver of a vehicle uses the display unit 20 generally as a night vision system to see further ahead of the vehicle than the headlamps will illuminate, which will allow for more time to react to the road elements. Therefore, a lapse in the video signal would be detrimental to the warning purpose of the night vision system.

In commercial vehicles, such as trailer trucks, it is common to flash, i.e. turn off and immediately turn back on, the headlamps of the truck as a signal to another vehicle that there is enough distance between the vehicle and truck to merge in front of the truck. In doing this, the headlamps 40 are turned off which open the circuit from the power source to the display unit. Consequentially, the camera, including the image on the display, is turned off because the power control signal was disrupted. After flashing the headlamps, the camera will turn back on, but without the invention the calibration process is reinitialized again, therefore causing a gap in viewing the video signal.

The system 5 is designed to delay the display unit 20 from shutting down or to maintain the video signal from the camera 30 during a temporary interruption, such as turning headlamps off 160, in the control signal. If the control signal is disrupted for a longer period of time than the programmed time 180, preferably about eight (8) seconds, then the camera and display unit turn off and there is no video signal delivered for viewing on the display unit 20. The display unit 20 will not be able to receive another video signal from the camera 30 until the calibration process or thermal equalization process is performed again. However, if the connection is disrupted for a period of time less than the programmed time 180, then the video signal to the display unit 20 is maintained 200 and there is no interruption or delay in viewing. Therefore, the temporary interruption of flashing headlamps will not cause the camera 30 to have to equalize again.

In an alternative embodiment, the power control signal is disrupted by closing the display unit 20, 170, i.e. HUD or HDD. If the display unit 20 is opened in a period of time less than the programmed time, then the video signal to the display unit 20 is maintained 200.

In a further embodiment, the camera 30 and display unit 20 have a power source separate from the vehicle battery. In still a further embodiment, the camera 30 and display unit 20 each have a different power source.

The foregoing description is, at present, considered to be preferred embodiments of the present invention. However, it is contemplated that various changes and modifications apparent to those skilled in the art may be made without departing from the present invention. Therefore, the foregoing description is intended to cover all such changes and modifications encompassed within the spirit and scope of the present invention, including all equivalent aspects.

It is claimed:

1. A method of controlling a camera for a vision system used on a vehicle comprising the steps of:
    generating a control signal that corresponds to a selected operating condition for the vehicle headlamps;
    turning said camera on with power from a first power source in response to said control signal to display a video signal from said camera, said camera remaining on in response to continued presence of said control signal; and
    maintaining said camera on for a programmed predetermined time period with power from said first power source during a temporary interruption of said control signal.

2. The method according to claim 1 wherein the step of maintaining said camera on includes the step of delaying turning off said camera during a temporary interruption of said control signal, with said camera being turned off when said interruption is for more than said programmed predetermined time period.

3. The method according to claim 1 wherein said control signal indicates headlamps of said vehicle are on.

4. The method according to claim 1 wherein said control signal further includes a signal that indicates a video display is opened.

5. The method according to claim 1 wherein said temporary interruption of said control signal is provided by turning off headlamps of said vehicle.

6. The method according to claim 4 wherein said temporary interruption of said control signal is provided by at least one of closing said video display and turning off said headlamps of said vehicle.

7. A method of controlling a camera for a vision system used on a vehicle comprising the steps of:
    generating a control signal on a vehicle that corresponds to a selected operating condition of external vehicle lighting of said vehicle;
    turning said camera on with power from a first power source in response to said control signal to display a video signal from said camera, said camera remaining on in response to continued presence of said control signal; and
    maintaining said camera on for a programmed predetermined time period with power from said first power source in response to a change in said control signal.

8. A vision system for use on a vehicle to be used in nighttime driving comprising:
    a power source for turning on a camera and display unit;
    a control signal indicative of the operating state of the vehicle headlamps, the control signal for allowing said power source to turn on said camera and display unit for said camera to calibrate in order to send a complete video signal to said display unit;
    a means for disrupting said control signal; and
    a means for maintaining said video signal for a programmed predetermined time period with power from said power source during said disruption.

9. The vision system according to claim 8 wherein said control signal is provided by a headlamp switch on a vehicle.

10. The vision system according to claim 9 wherein said means for disrupting said control signal is opening said headlamp switch.

11. The vision system according to claim 9 wherein said means for disrupting said control signal further includes at least one of providing a signal that said display unit in a closed position and opening said headlamp switch.

12. The vision system according to claim 8 wherein said means for maintaining said video signal is a programmed logic circuit connected to said power source designed to keep power to said camera and display unit for the programmed predetermined temporary time period.

13. A vision system for use on a vehicle to be used in nighttime driving comprising:
    a battery of the vehicle connected to a display unit;
    a camera connected to said display unit, wherein said battery is for sourcing power to said camera and display unit, wherein said camera power is provided through and controlled by said display unit;
    a control signal provided to said display unit for allowing said battery to turn on said camera and display unit for said camera to calibrate in order to send a complete video signal to said display unit, said control signal indicative of the operating state of the vehicle headlamps;

a logic circuit in a controller of said display unit, said logic circuit for providing a control signal for maintaining said video signal for a programmed predetermined time period during an interruption in said control signal said logic circuit turning said camera off when said interruption in said control signal is for more than said programmed predetermined time period.

14. A method of controlling a camera for a vision system used on a vehicle comprising the steps of:

generating a control signal indicating a video display on a vehicle is in an open position;

turning said camera on with power from a first power source in response to said control signal to display a video signal from said camera, said camera remaining on in response to continued presence of said control signal; and maintaining said camera on for a programmed predetermined time period with power from said first power source in response to an interruption of said control signal, wherein the interruption is caused by said video display being moved to a closed position.

15. A vision system for use on a vehicle to be used in nighttime driving comprising:

a power source for turning on a camera and display unit;

a control signal indicative of whether a vehicle video display is open, the control signal allowing said power source to activate said camera and display unit for said camera to calibrate in order to send a complete video signal to said display unit;

disrupting said control signal by closing the vehicle video display; and a means for maintaining said video signal for a programmed predetermined time period with power from said power source during said disruption.

* * * * *